(12) United States Patent
Powell

(10) Patent No.: US 9,067,291 B2
(45) Date of Patent: *Jun. 30, 2015

(54) RADIAL ARM SAW SAFETY TOP

(76) Inventor: Michael S. Powell, Vero Beach, FL (US)

( * ) Notice: Subject to any disclaimer, the term of this patent is extended or adjusted under 35 U.S.C. 154(b) by 422 days.

This patent is subject to a terminal disclaimer.

(21) Appl. No.: 12/860,459

(22) Filed: Aug. 20, 2010

(65) Prior Publication Data

US 2011/0017036 A1  Jan. 27, 2011

Related U.S. Application Data

(60) Division of application No. 11/805,508, filed on May 22, 2007, and a continuation of application No. 11/375,455, filed on Mar. 14, 2006, now Pat. No. 7,228,773, and a continuation of application No. 10/930,928, filed on Aug. 31, 2004, now Pat. No. 7,044,039.

(51) Int. Cl.

| | |
|---|---|
| *B23D 47/04* | (2006.01) |
| *B26D 7/18* | (2006.01) |
| *B27B 5/29* | (2006.01) |
| *B27G 19/02* | (2006.01) |
| *B23D 45/02* | (2006.01) |
| *B23D 47/02* | (2006.01) |
| *B23D 59/00* | (2006.01) |
| *B23Q 11/00* | (2006.01) |

(52) U.S. Cl.
CPC .......... *B23Q 11/0046* (2013.01); *B23D 45/025* (2013.01); *B23D 47/025* (2013.01); *B23D 47/04* (2013.01); *B23D 59/006* (2013.01); *Y10T 29/49716* (2015.01); *Y10T 83/207* (2015.04); *Y10T 83/7533* (2015.04); *Y10T 83/7607* (2015.04); *Y10T 83/7693* (2015.04); *Y10T 83/7734* (2015.04); *Y10T 83/7763* (2015.04); *Y10T 83/828* (2015.04); *Y10T 83/853* (2015.04); *Y10T 83/872* (2015.04); *Y10T 83/8722* (2015.04); *Y10T 83/929* (2015.04)

(58) Field of Classification Search
USPC .......... 83/24, 100, 375, 391, 397.1, 398, 452, 83/459, 467.1, 468.1, 471.2, 478, 485, 83/487–489, 520, 522.15, 544–546, 578, 83/581, 477.2; 144/251.1, 252.1, 252.2; 451/451, 453, 456, 457
See application file for complete search history.

(56) References Cited

U.S. PATENT DOCUMENTS

| | | |
|---|---|---|
| 1,993,219 A | 3/1935 | Merrigan |
| 2,759,503 A | 8/1956 | Goldschmidt |
| 2,806,492 A | 9/1957 | Becker |
| 2,839,102 A | 6/1958 | Kido |
| 2,913,926 A | 11/1959 | Hammond |
| 3,322,169 A | 5/1967 | Hilliard |

(Continued)

*Primary Examiner* — Clark F. Dexter
(74) *Attorney, Agent, or Firm* — Scott D. Smiley; Mark C. Johnson; The Concept Law Group, P.A.

(57) ABSTRACT

A radial arm saw is adapted with a safety top configured with cutting box enclosure that contains and collects substantially all of the sawdust generated during use. A dust collection system is in fluid communication with the cutting box for removing the sawdust contained therein. Spring biased push blocks function to hold the work piece in place during the sawing process while maintaining the user's hands safely away from the saw blade. A laser alignment device projects a beam within the cutting box along the cutting plane. A control panel is provided to allow use by authorized users upon entry of an authorization code.

16 Claims, 7 Drawing Sheets

(56) References Cited

U.S. PATENT DOCUMENTS

| | | |
|---|---|---|
| 3,401,724 A | 9/1968 | Kreitz |
| 3,468,076 A | 9/1969 | Jones |
| 3,765,289 A | 10/1973 | Gerber et al. |
| 4,026,173 A | 5/1977 | Livick |
| 4,096,789 A | 6/1978 | Blessinger |
| 4,144,781 A | 3/1979 | Kreitz |
| 4,241,505 A | 12/1980 | Bodycomb |
| 4,300,426 A | 11/1981 | Weaver |
| 4,469,318 A | 9/1984 | Slavic |
| 4,485,711 A | 12/1984 | Schnell |
| 4,494,433 A | 1/1985 | Gerber |
| 4,742,743 A | 5/1988 | Scarpone |
| 4,965,966 A | 10/1990 | Braasch |
| 5,199,343 A | 4/1993 | O'Banion |
| 5,269,356 A | 12/1993 | Bartz |
| 5,411,433 A * | 5/1995 | Keller .......................... 451/451 |
| 5,678,467 A | 10/1997 | Aigner |
| 5,774,992 A | 7/1998 | Lindenmuth |
| 7,044,039 B2 * | 5/2006 | Powell .......................... 83/100 |
| 7,100,486 B2 | 9/2006 | Akins et al. |
| 7,228,773 B2 * | 6/2007 | Powell .......................... 83/100 |
| 2004/0261592 A1 | 12/2004 | Chen |

* cited by examiner

RADIAL ARM SAW SAFETY TOP

CROSS REFERENCE TO RELATED APPLICATIONS

This application is a Divisional of U.S. patent application Ser. No. 11/805,508, filed on May 22, 2007, which is a Continuation of U.S. patent application Ser. No. 11/375,455 filed on Mar. 14, 2006, now U.S. Pat. No. 7,228,773, which is a Continuation of U.S. patent application Ser. No. 10/930,928, filed on Aug. 31, 2004, now U.S. Pat. No. 7,044,039, the entire disclosures of which are hereby incorporated herein by reference in their entireties.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to radial arm saws, and more particularly to a safety top for use in safe operation of radial arm saws while providing improved dust collection.

2. Description of Related Art

Radial arm saws are routinely found in wood working environments for use us in various wood cutting applications. Over the past several years, the use of the radial arm saw has expanded significantly due largely to versatility and simplicity of use. Today, radial arm saws are in use in wood working shops, garages, even retail outlets, such as hardware and home improvement stores.

A typical radial arm saw includes a work table having a horizontal flat top work surface with a vertically projecting backstop, commonly referred to as a fence. The material to be cut, such as a piece of wood, is supported on the work surface and against the fence. At the rear of the work table a vertical column extends upwardly. Extending horizontally from the top of the column is a radial arm, which is capable of rotation about the column, but which is generally positioned over the top of the table. A rotary power saw is suspended below the radial arm by a carriage adapted for travel along the length of the radial arm. In most operations, the saw is positioned over the work table and is moved along the radial arm to cut a workpiece positioned on the work surface.

While the radial arm saw is an efficient and proven power tool, there remain a number of problems and shortcomings associated with the operation thereof that heretofore have not been adequately solved or addressed. One such problem associated with the radial arm saw operation relates to the substantial amount of sawdust created and dispersed when cutting. The sawdust generated by a radial arm saw ranges from very fine dust particles to larger wood chips. While this problem has been widely recognized for many years, radial arm saw manufacturers have failed to develop an effective dust collection system for use with these saws. One common, yet ineffective, solution has been to provide the saw blade with a protective guard or hood adapted with a suction port connected to a vacuum-generating dust collection system by a hose. That attempt, however, has proven unsatisfactory and generally ineffective.

As a result of the persistent problems associated with saw dust, the background art reveals a number of attempts directed to dust collection systems for use with radial arm saws. For example, U.S. Pat. No. 2,839,102, issued to Kido, discloses a dust collecting attachment that mounts behind the guide fence of a radial arm saw. The attachment defines slotted openings aligned with kerfs in the guide fence, and is attached to a suction-generating dust collector apparatus. U.S. Pat. No. 3,322,169, issued to Hilliard, discloses a dust collector for a radial arm saw including a rectangular shroud having an inlet and a tapered tube extending rearwardly therefrom for connection to a vacuum hose. U.S. Pat. No. 3,401,724, issued to Kreitz, discloses a dust collector for a radial arm saw comprising a generally funnel-shaped hood positioned at the rear of the work table. The wide hood inlet opens toward the front of the work table and a narrow outlet is connected to a dust collector apparatus. U.S. Pat. No. 4,144,781, issued to Kreitz, discloses a dust collector for a radial arm saw including a generally funnel-shaped flat-bottomed shroud connected to a vacuum hose. The top and bottom of the shroud are contoured so that the shroud partially surrounds the column which supports the radial arm saw. U.S. Pat. No. 4,742,743, issued to Scarpone, discloses a radial arm saw accessory comprising a grid structure formed in the table surface in proximity to the fence to permit passage of sawdust therethrough.

It appears, however, that the above-referenced advances in the art of radial arm saw dust collection have not been successful in substantially containing and collecting sawdust generated by the radial arm saw. Accordingly, those devices have not gained widespread acceptance. Thus, there exists a need for improvements in radial arm saw design. More particularly, there exists a need for an improved dust collection system for use with radial arm saws.

Another serious problem present with the widespread use of radial arm saws relates to operator safety. More particularly, during normal use the rotating saw blade often comes in close proximity to the operators hands and fingers. As a result, numerous individuals have been seriously injured by inadvertent contact with the rotating saw blade while operating the radial arm saw. The problem is complicated since operation of the saw requires the user to move the saw/blade across the work surface while cutting thereby increasing the risk of injury. The risk of injury increases when the saw is used by inexperienced operators in garage shops or employees in retail locations. Despite the serious risk of injury inherent with conventional radial arm saw designs, manufacturers have failed to provide adequate measures intended to prevent injury.

The background art reveals a number of attempts directed to protecting operators from injury while operating radial arm saws. These attempts include blade guards intended to prevent the operator's hand from contacting the rotating blade. Blade guards, however, have proven ineffective. Other attempts include providing work piece guides and push devices designed to assist the operator in positioning the work piece. U.S. Pat. No. 5,678,467, issued to Aigner, discloses a handle adapted for holding or pushing wood during the sawing process. The Aigner device, and others in the art, provide handle-like structures that engage the wooden workpiece such that the user's hand is positioned away from the cutting plane. The prior art further reveals a number of work piece guides, primarily for use with table saws. Representative disclosures of such devices are found in U.S. Pat. No. 4,026, 173 (Livick), U.S. Pat. No. 4,469,318 (Slavic), and U.S. Pat. No. 4,485,711 (Schnell). These devices, however, are adapted for pushing and guiding the workpiece though the cutting area, and are generally not suitable for use with a radial arm saw wherein the saw blade is moved through the workpiece. Accordingly, there exists a need for improvements directed to radial arm saws directed to protecting operators from injury by securing the workpiece.

BRIEF SUMMARY OF THE INVENTION

The present invention overcomes the disadvantages and shortcomings in the art by adapting a radial arm saw with a safety top configured with a cutting box enclosure for containing and collecting substantially all of the sawdust generated when in use. The safety top further includes spring biased push blocks that function to hold the work piece in place during the sawing process while maintaining the user's hands safely away from the saw blade. In accordance with the present invention, a radial arm saw is adapted with a safety top providing an improved work surface, a fully integrated structure that contains and captures substantially all of the sawdust and particles generated by the saw, and integrated push blocks that are mechanically biased to secure the workpiece in engagement with the fence.

Accordingly, it is an object of the present invention to provide an improved safety top for use with radial arm saws.

Another object of the present invention is to provide an improved dust collection system for use with radial arm saws.

Still another object of the present invention is to provide advancements in control systems for radial arm saws.

In accordance with these and other objects, which will become apparent hereinafter, the instant invention will now be described with particular reference to the accompanying drawings.

DETAILED DESCRIPTION OF THE INVENTION

Figure 1:
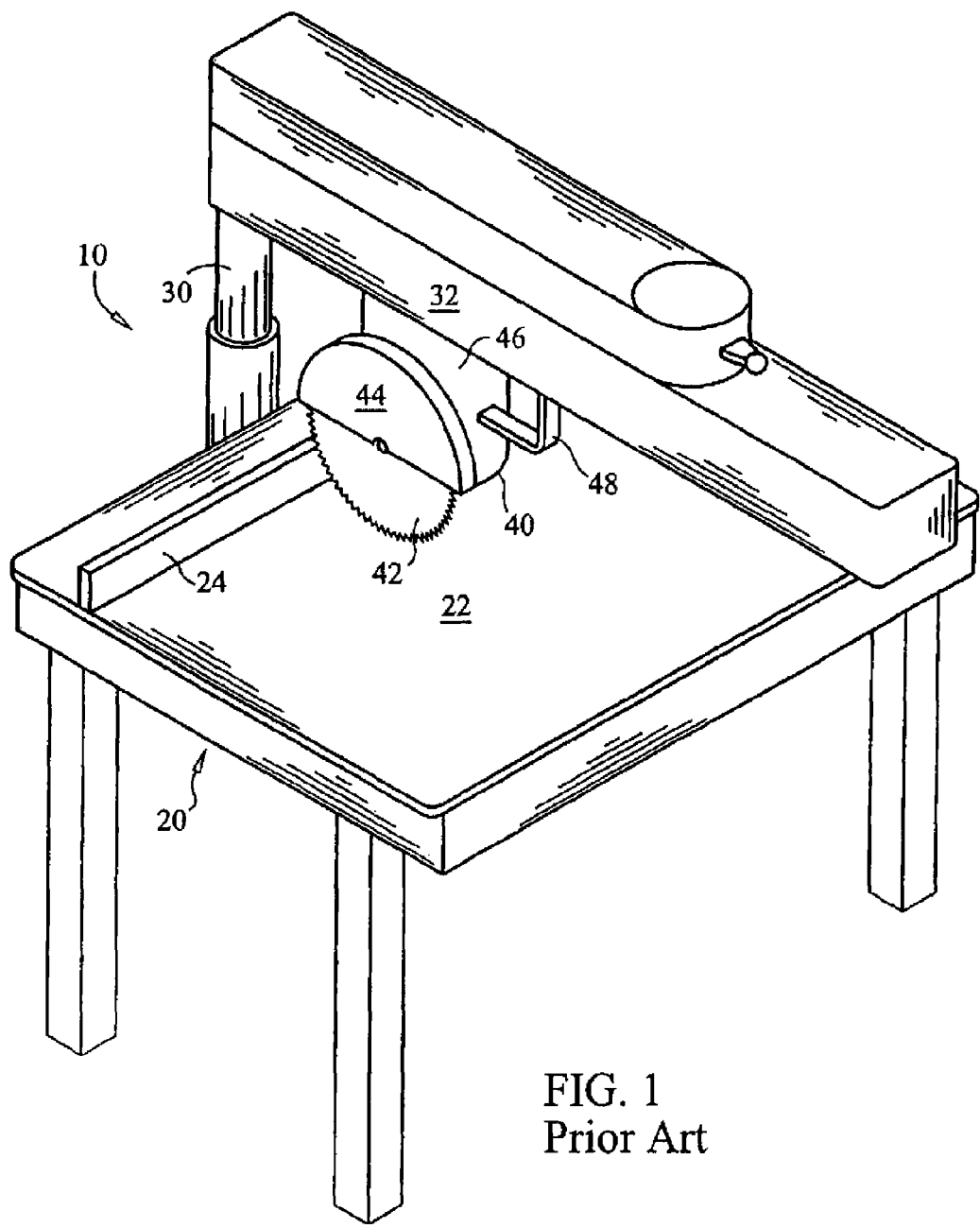
FIG. 1 depicts a typical radial arm saw of the prior art.

FIG. 1 depicts a radial arm saw 10 typical of prior art saws to which the present invention most directly pertains. The typical radial arm saw 10 includes a work table 20 having a horizontal flat top work surface 22 with a vertically projecting backstop 24, commonly referred to as a rip fence 24. The material to be cut, such as a piece of wood, is supported on work surface 22 in abutting relation with fence 24. A vertical column 30 extends upwardly from the back of work table 20. Extending horizontally from the top of column 30 is a radial arm 32, which is capable of rotation about the column, but which is generally positioned over the top of the table 20. A rotary power saw 40 is suspended below the radial arm 32 by a carriage (not shown) adapted for travel along the length of radial arm 32. Power saw 40 includes a rotating blade 42, a protective blade shroud 44, a motor housing 46, and a handle 48. As noted above, blade shroud 44 is often configured to function as a dust collecting shroud by attachment of a shop vac dust collector thereto. In most operations, the saw 40 is positioned over the work table 20 and is moved along the radial arm 32 to cut a workpiece positioned on the work surface 22 when pulled by the user such that the saw 40 moves from behind the fence 24 through the workpiece to be cut.

Figure 2:
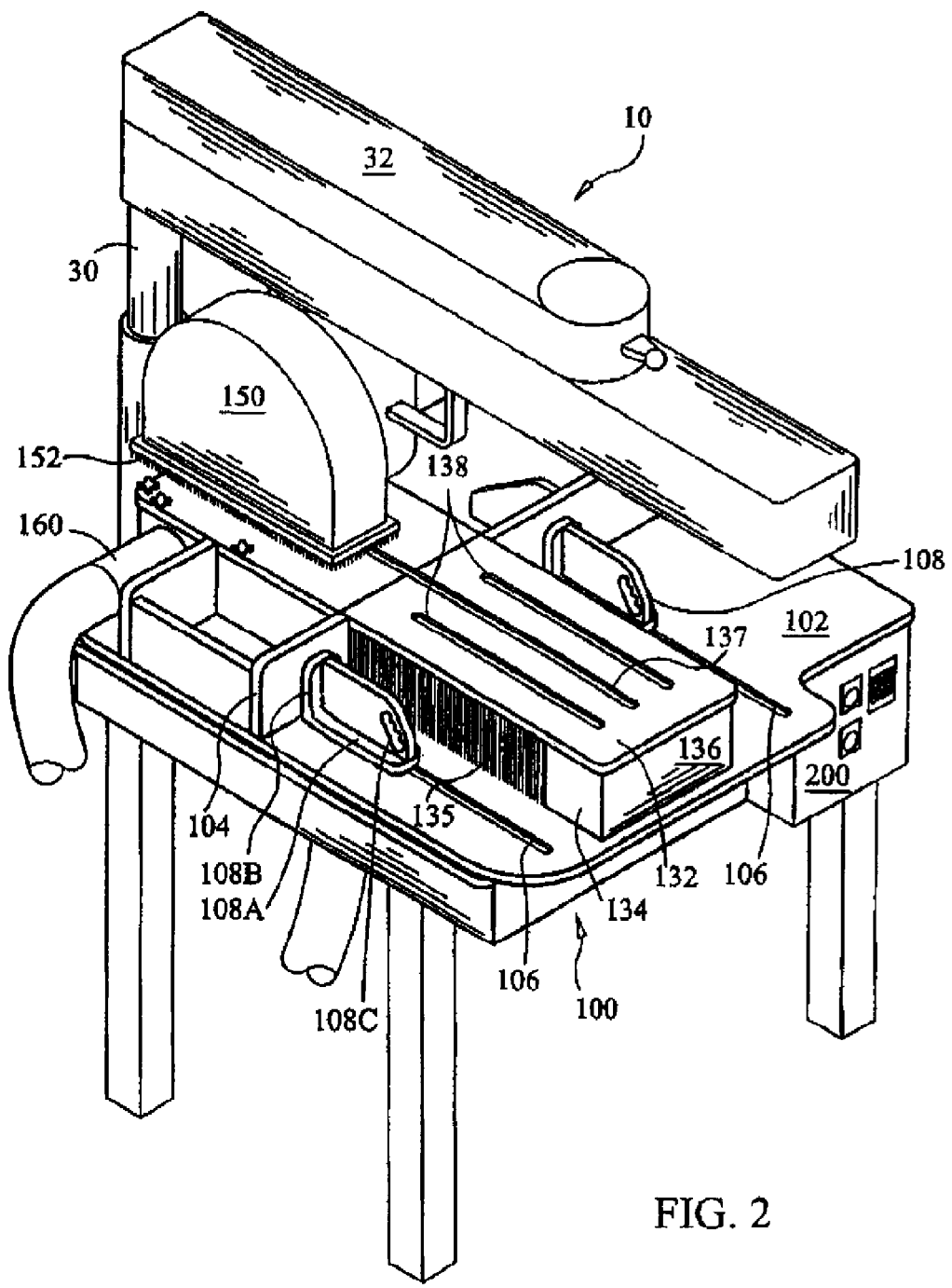
FIG. 2 depicts a radial arm saw adapted with a safety top in accordance with the present invention.

FIG. 2 depicts a radial arm saw 10 adapted with a safety top assembly, generally referenced as 100, an improved control system, which includes a control panel 200, according to the present invention. Safety top 100 is preferably fabricated from a durable material. In a preferred embodiment, safety top 100 is fabricated from sheets of phynolic material, which sheets are known for their strength, high heat resistance and flame retardancy. It should be noted, however, that any suitable material is considered within the scope of the present invention. Safety top 100 is preferably a fully assembled structure adapted for mounting directly on to a radial arm saw with minimal if any modification required.

Figure 3:
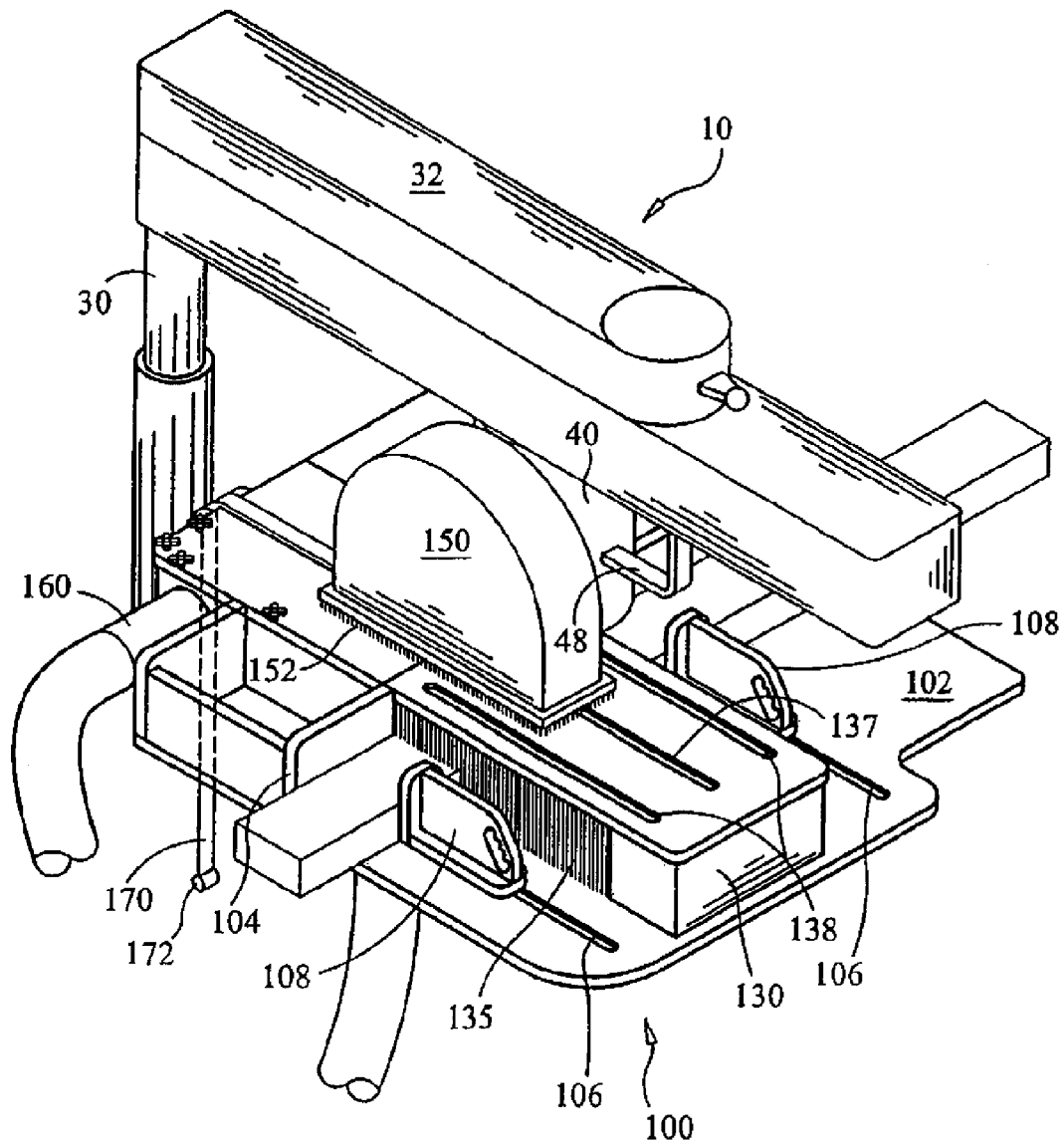
FIG. 3 illustrates cutting of a wood work piece using a radial arm saw adapted with a safety top in accordance with the present invention.

Safety top 100 includes a generally planar work surface 102 and a backstop or rip fence 104 (hereinafter "fence") vertically projecting therefrom. The work surface 102 is adapted to replace the original work surface 22 and the original workpiece-support fence 24 of a radial-arm saw 10, such as those shown in FIG. 1. Work surface 102 defines a pair of slotted apertures 106 that function as guide slots for push handles 108. Each push handle 108 includes a base 108A, a vertical end wall 108B for engaging a workpiece, and a cutout portion 108C to facilitate grasping thereof by the user. Base 108A includes a downwardly projecting tongue sized for slidable inserted engagement with slotted aperture 106. FIG. 3 depicts a wood workpiece, such as a two-by-four disposed between push handles 108 and rip fence 104.

Figure 4:
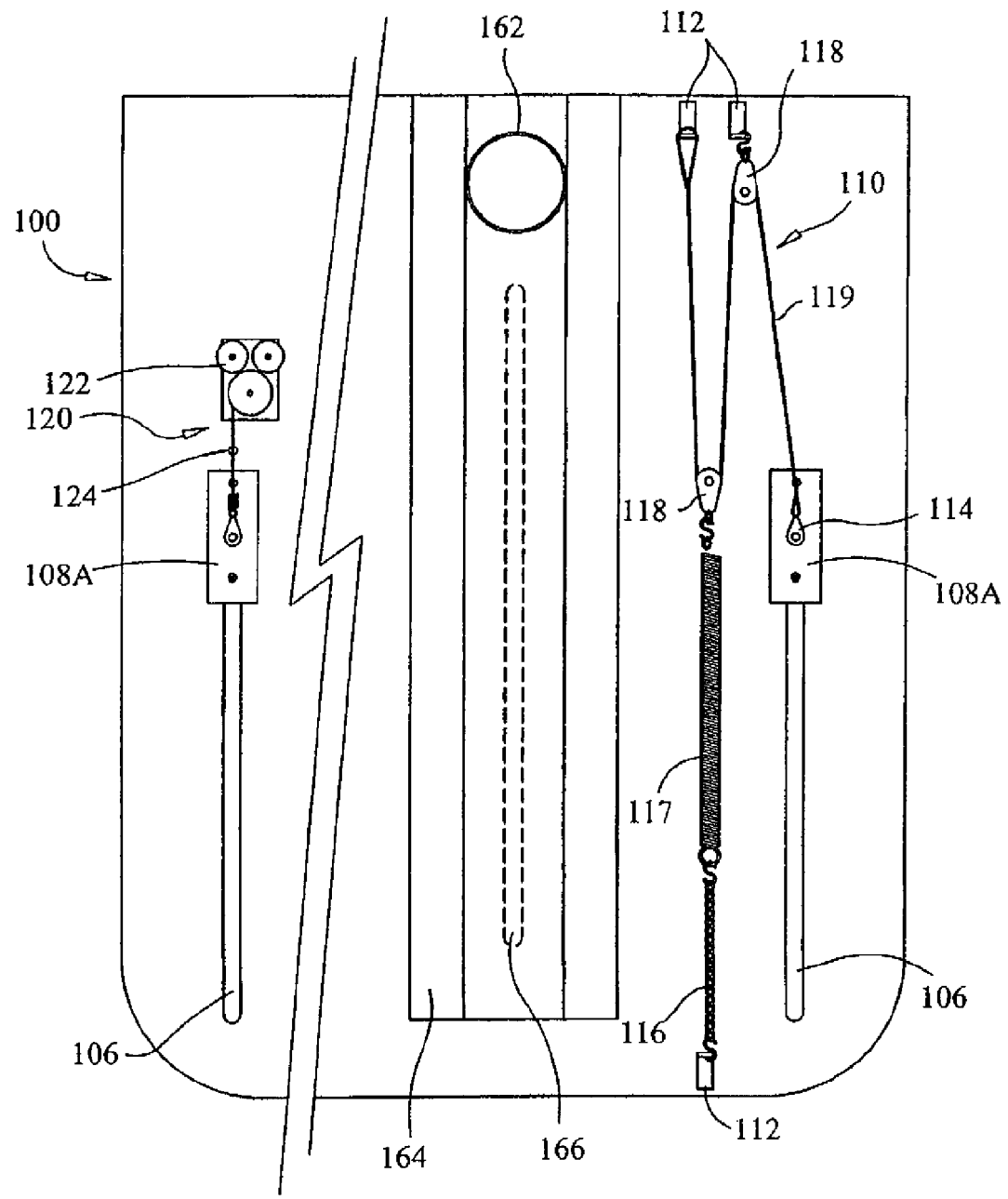
FIG. 4 is a bottom view of the safety top showing alternate mechanical biasing systems for the push handles.

Each push handle 108 is mechanically biased toward fence 104 by a spring loaded biasing mechanism preferably disposed on the bottom surface of work surface 102. FIG. 4 shows a bottom view of safety top 100 and discloses a preferred helical spring loaded embodiment of the mechanical biasing system depicted on the right hand side of FIG. 3, which embodiment is generally referenced as 110, and an alternate auto-retracting embodiment mechanical biasing system depicted on the left hand side of FIG. 3, which embodiment is generally referenced as 120. The helical spring mechanical biasing system 110 includes a plurality of anchors 112 fastened to the underside of work surface 102, and an anchor 114 fastened to the lower portion of push handle 108. A spring biased cable and pulley system is connected to anchors 112 and 114. More particularly, the spring biased cable and pulley system includes a chain section 116 connected at one end thereof to an anchor 112, a helical spring 117 connected on one end thereof to chain 116 and connected at the opposite end thereof to a first pulley 118. A cable 119 is routed in a two pulley configuration with opposing cable ends connected to a fixed anchor 112 and anchor 114 respectively thereby realizing a mechanical advantage. The provision of chain section 116 allows for adjustment of the tension by adjustable connection of individual links to anchor 112. The alternate embodiment mechanical biasing system 120 includes an automatic retraction apparatus 122 connected to the lower portion of push handle 108 by a cable 124. Automatic retraction apparatus 122 is generally characterized as providing a retraction force of a substantially constant level by use of internal spring mechanisms. It should be noted, however, that any suitable biasing system, whether mechanical or electrical is considered within the scope of the present invention. As should be apparent, the mechanical biasing systems function to urge push handles 108 toward rip fence 104 so as to secure a piece of wood in place for the sawing process.

Safety top 100 further includes dust collecting cutting box 130 mounted on and projecting above work surface 102. Cutting box 130 is preferably mounted in alignment with power saw 40, and particularly saw blade 42 for reasons more fully discussed hereinbelow. Cutting box 130 is bounded by a floor formed by the work surface 102, and further includes a top 132, opposing sides 134, and front and rear walls 136. Top 132 defines a plurality of slotted apertures ("slots"), including a saw blade slot 137 aligned with saw blade 42, and left and right slotted apertures 137 disposed on opposing sides of blade slot 137 and in parallel relation therewith. Saw blade slot 137 allows saw blade 42 to pass below cutting box top 132 during the sawing process. Left and right slotted apertures 138 function to provide the user with a line of sight through cutting box top 132 to the cutting area disposed below. Cutting box sides 134 include portions thereof formed by brush bristles 135 connected to and projecting downwardly from top 132, extending forward from fence 104. Brush bristles 135 allow a work piece to be inserted into cutting box 130 and automatically form a seal to contain saw dust within cutting box 130. The present invention further contemplates providing the saw portion with a specially adapted semi-circular shroud 150 in partial covering relation with the saw blade. Shroud 150 defines a bottom opening having a generally rectangular cross-section, which opening includes brush bristles 152 attached to the peripheral edge thereof. Shroud bristles 152 project downwardly from shroud 150 and are in sweeping contact with the cutting box top 132 thereby forming a dust seal between shroud 150 and top 132 as the saw moves back and forth while cutting the work piece.

Cutting box 130 thus defines a wood-cutting portion wherein the rotating saw blade meets the work piece during the cutting process and a dust-collecting portion that functions to contain the sawdust and wood chips generated as the blade cuts through the wood. The cutting box and its internal chamber include a wood-cutting portion on one side of a plane defined by a front (forward facing) face of the fence 104 where the work piece is located and the cutting process takes place, and a dust-collecting portion on the other side of the plane. The fence 104 has a gap therethrough which allows for passage of the blade during the cutting process. Accordingly, the dust-collecting portion of the cutting box 130 is further adapted for connection to an external dust collection system. More particularly, the dust-collecting portion of the cutting box 130 is separated from the wood-cutting portion of the dust collecting cutting box 130 by the fence 104. A gap in the fence 104 (shown in FIG. 5), where the saw blade 42 passes between the wood-cutting portion and the dust-collecting portion of the dust collecting cutting box 130, allows the external dust collection system to pull air (and saw dust) from the wood-cutting portion into the dust-collecting portion of the dust collecting cutting box 130. The wood-cutting portion of the dust collecting cutting box 130 is adapted with first and second dust collection outlet ports, referenced as 160 and 162 respectively. Each outlet port provides a connection point for attachment of a hose from a vacuum generating external dust collection system. Since vacuum type dust collection systems are well known, those systems shall not be further detailed. Outlet port 160 is preferably located rearward along cutting box side 134 and thus places the interior of cutting box 130 in fluid communication with the external dust collection system. As best depicted in FIG. 4, second outlet port 162 is defined by a dust collecting tray 164 disposed beneath work surface 102 in alignment with a slotted aperture 166 defined in the bottom of work surface 102. First outlet port 160 and second outlet port 162 are preferably connected to a common dust collection system by a vacuum hose adapted with a Y-fitting.

As best depicted in FIG. 3, safety top 100 further includes a flexible, generally flat, strip of sealing material 170 having a first end thereof attached to shroud 150 and a second end 172 thereof hanging or draping down the back side of safety top 100. Sealing strip 170 further includes opposing edges thereof riding within grooves formed on opposing sides of saw blade slot 137. Accordingly, as the saw is moved forward during the cutting process, sealing strip 170 is pulled in trailing relation with shroud 150 so as to cover or seal that portion of saw blade slot 137 behind the saw thereby providing a seal and preventing saw dust from escaping. As the saw is moved rearward during the cutting process sealing strip 170 is pushed rearward while traveling within grooves formed on opposing sides of saw blade slot 137. As should be apparent, any sawdust generated during operation of the radial arm saw adapted with a safety top 100 in accordance with the present invention will be contained within cutting box 130 and will be removed therefrom via dust collection outlet ports 160 and 162.

Figure 5:
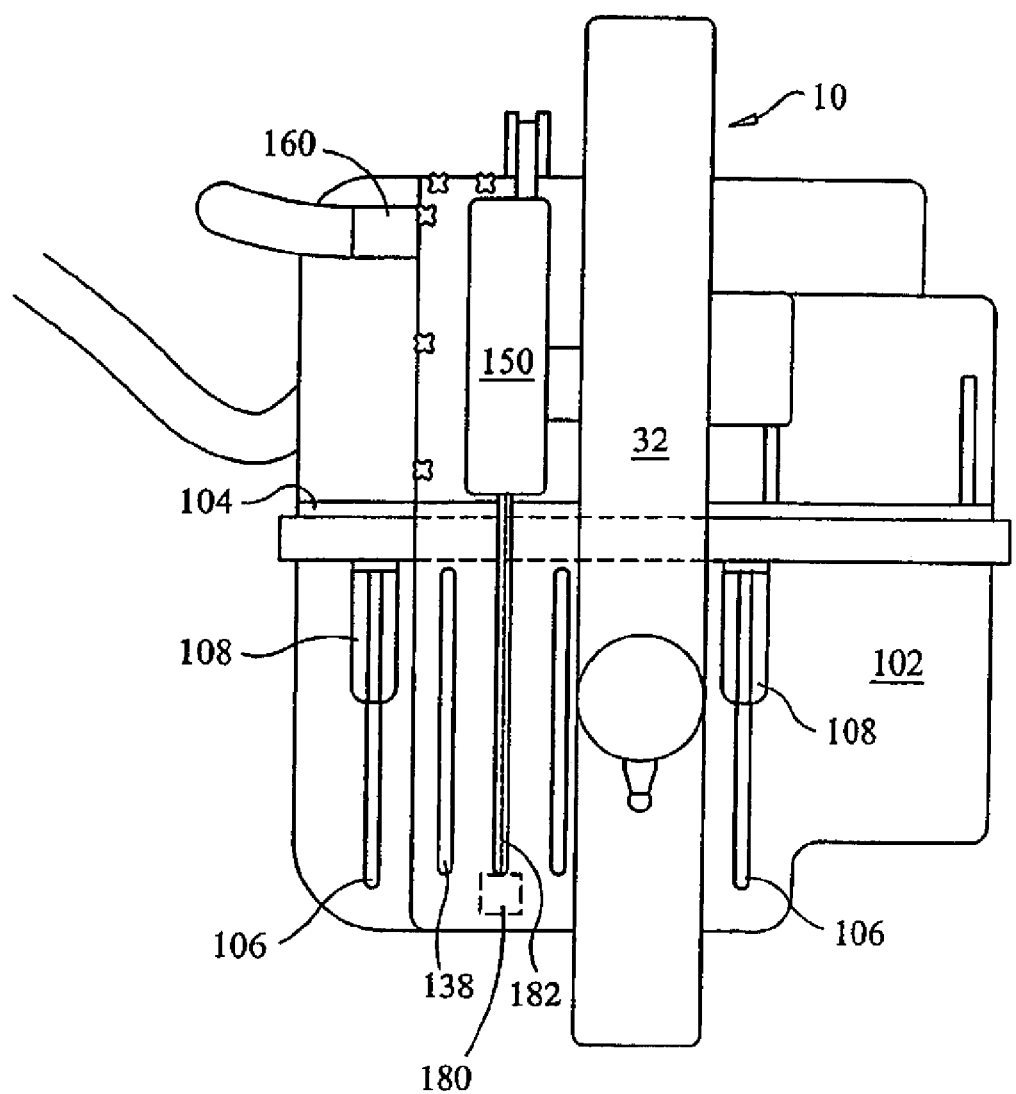
FIG. 5 is a top view of the safety top wherein the saw is positioned to cut a wood work piece.
Figure 6:
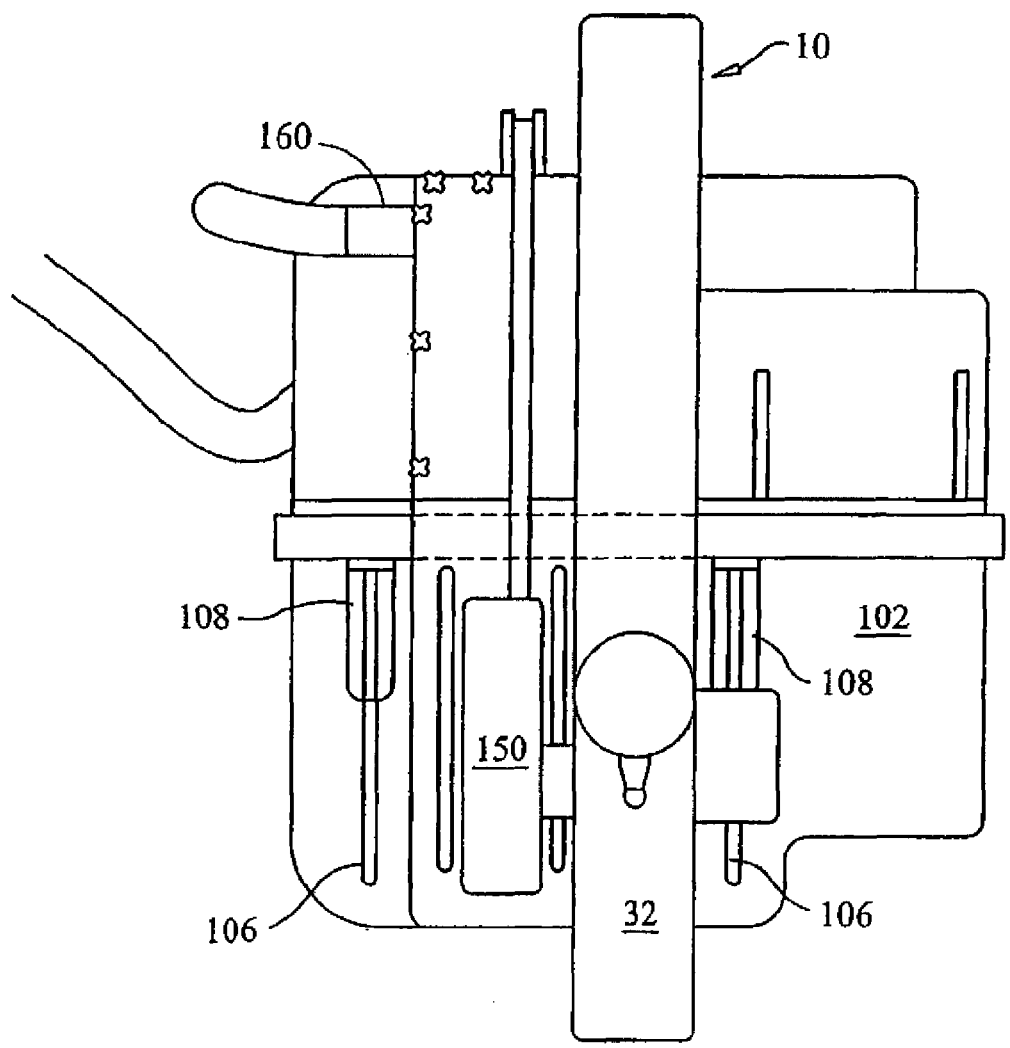
FIG. 6 is a top view of the safety top wherein the work piece has been cut.

As best depicted in FIGS. 5 and 6, radial arm saw safety top 102 further includes a laser alignment device 180 for projecting a light beam 182 over the work piece to insure proper alignment and precise cutting. In a preferred embodiment, laser alignment device 180 is mounted within cutting box 130 and oriented so as to project a light beam over the work piece and along the cutting plane formed by the edge of the saw blade. Light beam 182 thus provides visible indication as to exactly where the saw blade will intersect the work piece. Light beam 182 may be visible to the operator through any of cutting box top slots 137 or 138.

Figure 7:
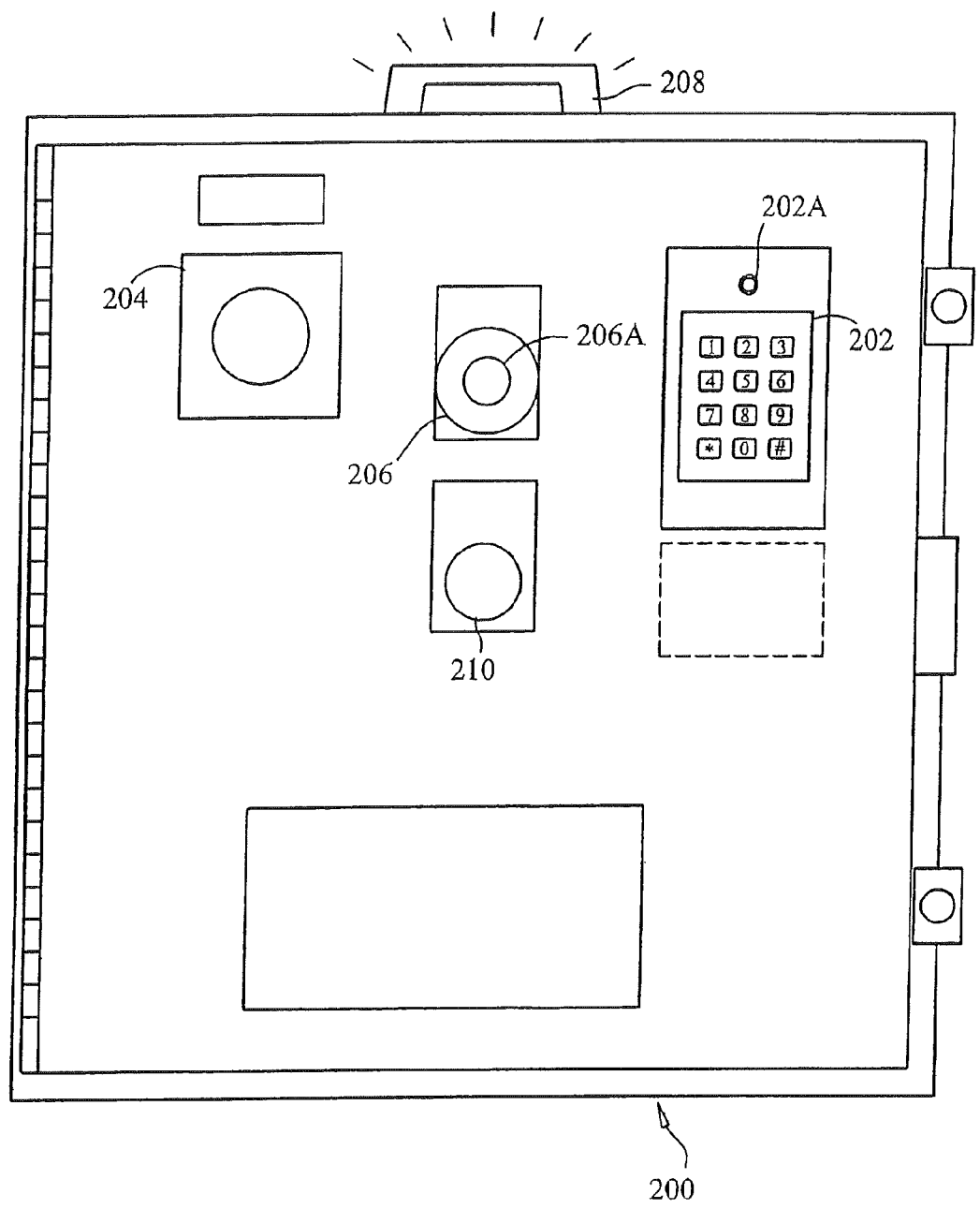
FIG. 7 depicts a control panel for use with the present invention.

As further illustrated in FIG. 2, the present invention may further include a control panel, referenced as 200 which functions to provide safe and efficient operation of the radial arm saw, particularly for saws operating in retail store environments, such as saws operating in home improvement and hardware stores. Control panel 200 provides a primary connection to electrical power, such as 208 VAC, 230 VAC, or 460 VAC electrical power and includes a step-down electrical transformer (not shown) capable of 24 VAC output. The ability of control panel 200 to operate using a range of voltages is considered important since the power available at different locations often varies. Control panel 200 includes a keypad 202 that provides an input device to restrict operation to authorized users who enter an appropriate authorization code. A power supply is connected to the 24 VAC output for providing DC power to keypad 202. As shown in FIG. 7, control panel 200 further includes a main disconnect switch 204 that enables quick disconnection of power to the saw and various components. In addition, a push-start/pull-stop control button 206 is provided to initiate or discontinue operation. Further, control panel 200 includes a visual alarm beacon 208 that is configured to flash when power is supplied to the radial arm saw systems, and an alarm horn 210 that is configured to generate an audible sound after a predetermined time period to indicate that the radial arm saw is about to shut down.

The operating sequence for a radial arm saw adapted with a control panel according to the present invention is a follows. A red indicator light 202A on the keypad indicates that power is being supplied to the radial arm saw control panel. The user enters the appropriate security code on the keypad to initiate operation. As should be apparent, any suitable code may be used. Upon entry of the appropriate code, a light 206A on control button 206 illuminates indicating that a predetermined operation period, such as five minutes, has begun. The user then must pull control button 206 to automatically supply power from the control panel to the radial arm saw and dust collection system, at which time beacon 208 is activated thus providing a visual signal/warning that power has been supplied and the systems are operational. Shortly before expiration of the predetermined operation period (e.g. 30 seconds prior to expiration) alarm horn 210 sounds as a signal that the saw will automatically shut down shortly. While the system is programmed to allow operation for a predetermined period of time before automatically shutting down, the period of operation may be extended by re-entering the authorization code. If, at any time, the operator wishes to manually shut the systems down he simply must push control button 206.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A retrofitting safety top for use with a radial-arm-saw assembly, the safety top comprising:
    a work surface;
    a workpiece-support fence coupled to and substantially perpendicular to the work surface;
    at least one workpiece-securing member movable with respect to the work surface at least in a direction toward and away from the workpiece-support fence to secure a workpiece between the workpiece-support fence and the at least one workpiece securing member for immobilizing the workpiece during a sawing operation; and
    a cutting box disposed above the work surface, the cutting box including:
        a wood-cutting portion comprising:
            opposing first side wall portions, at least one of the first side wall portions defining an opening to allow a workpiece to be at least partially inserted within the cutting box through the opening;
            a front wall that extends from one of the first side wall portions to the other of the first side wall portions and encloses a front end of the cutting box; and
            a first top portion that is fixed relative to the first side wall portions, extends from one of the first side wall portions to the other of the first side wall portions, and substantially encloses a top of the wood-cutting portion of the cutting box, wherein the first to wall is disposed at a distance from the work surface; and
        a dust-collecting portion comprising:
            opposing second side wall portions; and
            a second top portion that is fixed relative to the second side wall portions, extends from one of the second side wall portions to the other of the second side wall portions, and substantially encloses a top of the dust-cutting portion of the cutting box, wherein the second top wall portion is disposed at a distance from the work surface,
    wherein the workpiece-support fence defines a plane that separates the wood-cutting portion and the dust-collecting portion, and
    wherein an elongated slotted aperture extends through the first top portion and through the second top portion, the elongated slotted aperture extending substantially perpendicular to the workpiece-support fence and through said plane, the elongated slotted aperture having a width for receiving a lower portion of a radial-arm-saw blade as the radial-arm-saw blade travels during the sawing operation.

2. The retrofitting safety top according to claim 1, wherein the work surface is for replacing an original work surface and an original workpiece-support fence of a radial-arm saw.

3. The retrofitting safety top according to claim 1, wherein:
    the work surface is for attaching to at least a portion of an original work surface of a radial-arm saw.

4. The retrofitting safety top according to claim 1, wherein:
    the workpiece-support fence has a gap therethrough;
    at least the first top portion, the opposing first side portions, and the front wall, along with at least a portion of the work surface, together define an interior of the wood-cutting-portion;
    at least the second top portion and the opposing second side portions, along with the work surface, together define an interior of the dust-collecting-portion; and
    the wood-cutting-portion interior fluidically communicates with the dust-collecting-portion interior through the blade gap.

5. The retrofitting safety top according to claim 4, wherein the slotted aperture is aligned with the blade gap.

6. The retrofitting safety top according to claim 4, further comprising a vacuum system fluidically communicating with the dust-collecting portion interior and, when activated, the vacuum system is operable to remove sawdust from the dust-collecting portion interior.

7. The retrofitting safety top according to claim 1, wherein each of the opposing first side wall portions defines a respective said opening that allows a workpiece to be inserted therethrough.

8. The retrofitting safety top according to claim 1, wherein the dust-collecting portion further comprises a rear wall.

9. The retrofitting safety top according to claim 8, wherein at least one of the second side wall portions a sawdust-exit opening.

10. The retrofitting safety top according to claim 1, wherein a portion of the work surface defining a bottom of the dust-collecting portion includes a sawdust-exit opening.

11. The retrofitting safety top according to claim 10, further comprising a dust-collecting tray disposed below the sawdust-exit opening.

12. The retrofitting safety top according to claim 1, wherein one of the opposing second side portions includes a first sawdust-exit opening.

13. The retrofitting safety top according to claim 12, wherein a portion of the work surface defining a bottom of the dust-collecting portion includes a second sawdust-exit opening.

14. The retrofitting safety top according to claim 1, wherein the first top portion is integral with the second top portion.

15. The retrofitting safety top according to claim 1, wherein the first top portion is adjacent the second top portion.

16. In combination with a radial-arm saw assembly comprising a table with a front, a rear, and a top surface, a vertical column having a top and extending upwardly at the rear of the table, a radial arm extending horizontally from the top of the column towards the front of the table, a carriage coupled to and adapted for travel along the length of the radial arm, a rotary power saw suspended below the radial arm by the carriage, the rotary power saw including a radial-arm-saw blade, a protective blade shroud, and a handle, a retrofitting safety top comprising:
    a work surface mounted on the table;

a workpiece-support fence coupled to and substantially perpendicular to the work surface;

at least one workpiece-securing member movable with respect to the work surface at least in a direction toward and away from the workpiece-support fence to secure a workpiece between the workpiece-support fence and the at least one workpiece-securing member for immobilizing a workpiece during a sawing operation; and a cutting box disposed above the work surface, the cutting box including:

a wood-cutting portion comprising:

opposing first side portions, at least one of the first side portions defining an opening to allow the workpiece to be at least partially inserted within the cutting box through the opening;

a front wall; and a first top portion disposed at a distance from the work surface; and a dust-collecting portion comprising:

opposing second side wall portions; and a second top portion disposed at a distance from the work surface;

wherein the workpiece-support fence defines a plane that separates the wood-cutting portion and the dust-collecting portion, and wherein an elongated slotted aperture extends through the first top portion and through the second top portion, the elongated slotted aperture extending substantially perpendicular to the workpiece-support fence and through said plane, the elongated slotted aperture having a width sufficient to receive a lower portion of the radial-arm-saw blade as the radial-arm-saw blade travels during the sawing operation.

\* \* \* \* \*